United States Patent [19]

Singh

[11] 4,144,007

[45] Mar. 13, 1979

[54] TIRE STRIPPING MECHANISM FOR DUAL CAVITY TIRE PRESS

[75] Inventor: Anand P. Singh, Youngstown, Ohio

[73] Assignee: NRM Corporation, Akron, Ohio

[21] Appl. No.: 857,239

[22] Filed: Dec. 5, 1977

[51] Int. Cl.² ............................. B29C 7/00; B29H 5/08
[52] U.S. Cl. ..................................... 425/34 R; 425/38; 425/58
[58] Field of Search ................... 425/33, 34 R, 38, 43, 425/58

[56] References Cited

U.S. PATENT DOCUMENTS

| | | | |
|---|---|---|---|
| 2,721,355 | 10/1959 | Zangl | 425/38 |
| 3,260,782 | 7/1966 | Soderquist | 425/43 X |
| 3,714,321 | 1/1973 | Yoshida et al. | 425/38 X |
| 3,734,656 | 5/1973 | Balle | 425/34 R |
| 3,790,656 | 2/1974 | Getz | 425/58 X |
| 3,846,058 | 11/1974 | Yoshida et al. | 425/38 |

Primary Examiner—J. Howard Flint, Jr.

Attorney, Agent, or Firm—Maky, Renner, Otto & Boisselle

[57] ABSTRACT

A dual cavity tire press having side by side mold sections incorporate vertically extending center mechanisms which include a shaping bladder. The center mechanisms are moved vertically after the press opens while the bladder is within the tire to strip the tire from the bottom mold sections. Vertical movement of the center mechanisms is obtained by a single floating horizontally disposed piston-cylinder assembly which is mounted at the front of the press outside of the base, each end of the piston-cylinder assembly being connected through a lever arrangement to move the respective bead lift posts of the center mechanisms vertically. When the piston-cylinder assembly is pressurized, its entire force is applied simultaneously to each center mechanism to move the same vertically and such force is maintained throughout the vertical height movement of both center mechanisms. By a removable stop or lock, one of the center mechanisms may be made inoperable without affecting the movement and operation of the other.

22 Claims, 4 Drawing Figures

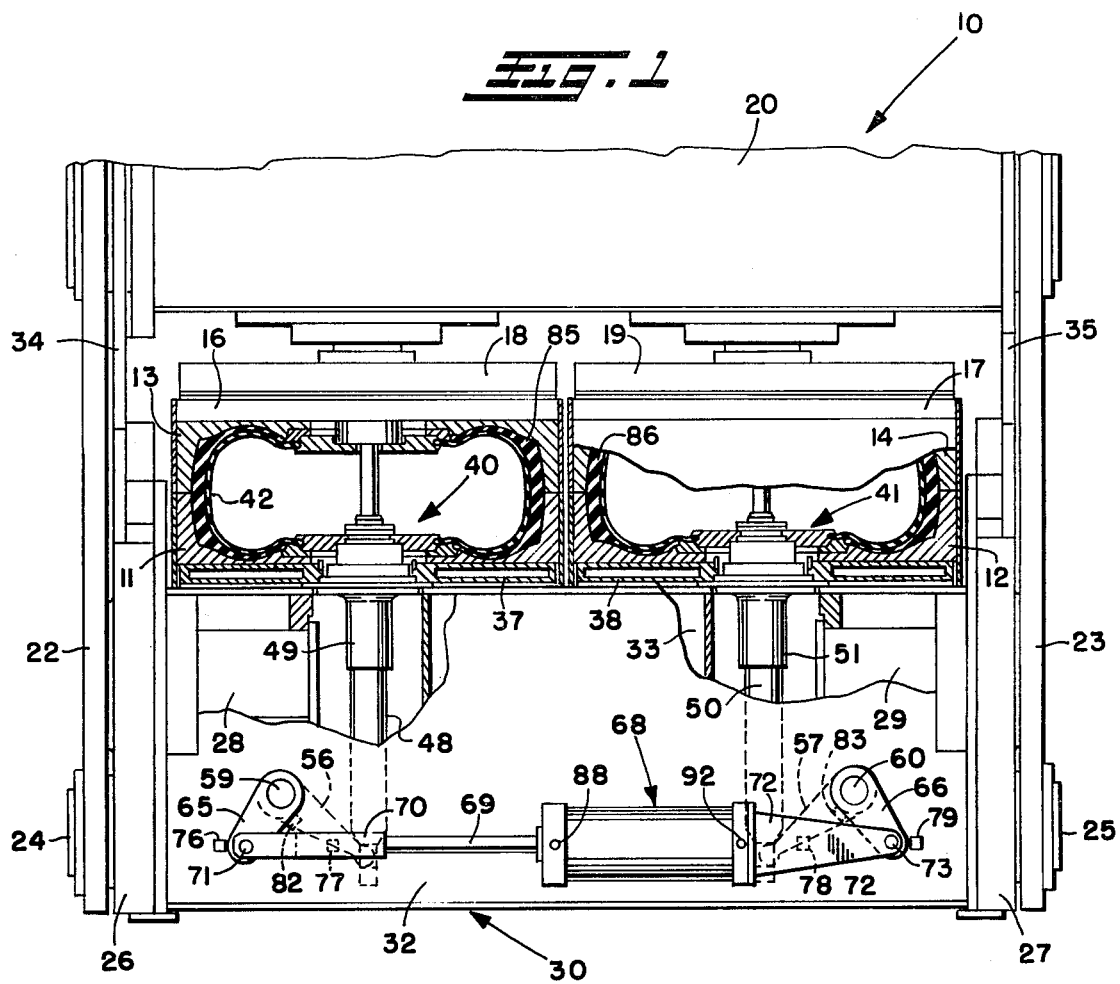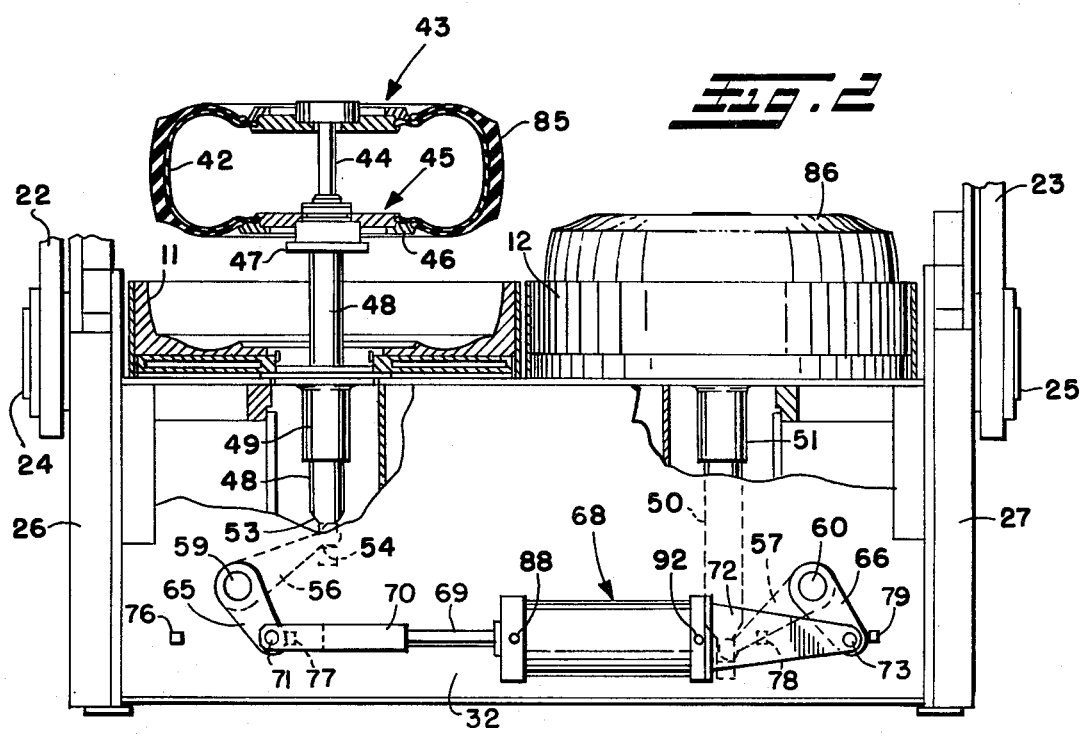

TIRE STRIPPING MECHANISM FOR DUAL CAVITY TIRE PRESS

This invention relates generally as indicated to a dual cavity press and a stripping mechanism therefor for stripping the tires from the bottom mold sections.

Conventional tire presses which include center mechanisms projecting from the bottom mold sections generally use such center mechanisms to strip the tire from the bottom mold section after the press has been opened and the tire stripped from the top mold section. Such center mechanisms may include a shaping bladder which will remain in the tire during such stripping action. The bladder may be of the open ended type held top and bottom by relatively vertically movable clamping assemblies. The center mechanism may, however, be of the bladderless type wherein collapsible bead pressing rings are employed in lieu of the bladder clamping assemblies. In such stripping mechanisms, a substantial vertical force may be required particularly if the tires are large and wide. Also, a substantial vertical force may be required downwardly after the tire is removed properly to seat the lower bead ring, usually a part of the lower clamping assembly, in the bottom mold section.

After the tire is elevated following stripping, an unloader is usually positioned between the tire and the bottom mold section. The bladder is then axially elongated to be stripped from the tire and the tire deposited on the unloading conveyor or arms.

Another problem encountered in presses and stripping mechanisms of the type described is that in certain uses the stripping force required for one cavity may vary substantially from the other. This is particularly true if the press is curing two different sizes or types of tires.

Examples of such prior art presses and stripping mechanisms may be seen in Barton et al. U.S. Pat. No. 4,013,186 issued Mar. 22, 1977, and Soderquist U.S. Pat. No. 2,836,847 issued June 3, 1958. In such Barton patent two parallel piston-cylinder assemblies are employed for each center mechanism making four altogether. Moreover, such piston-cylinder assemblies are positioned within the parallel vertical front and rear plates of the base of the press supporting the bottom mold sections thus making such cylinder assemblies difficult to reach for maintenance and service purposes.

While Soderquist U.S. Pat. No. 2,836,847 discloses a single piston-cylinder assembly operating both center mechanisms through the well known and complex "wiffle-tree" mechanism, the cylinder assembly is nonetheless positioned in or behind the base frame, again making it substantially inaccessible for maintenance and service purposes. Moreover, in the mechanism of such Soderquist patent, a complex ball pin is employed which permits transfer of forces from one lever system to the other only for a limited part of the stroke of the cylinder assembly. Thus, if both tires are difficult to strip, the cylinder assembly force is divided between each center mechanism. The full force of the piston-cylinder assembly cannot be applied to both center mechanisms for the entire vertical movement thereof both upwardly and downwardly.

It is oftentimes desirable that a dual cavity press be made operational for only one cavity. It is believed apparent from the aforementioned Barton et al. and Soderquist patents that this cannot readily be accomplished. The stripping mechanism of the Soderquist patent, for example, cannot be modified to function for a single cavity only without substantial disassembly or removal of parts.

It is accordingly highly desirable to have a dual cavity press which can readily be modified to operate as a single cavity press. It is also of course desirable to have a stripping mechanism which is readily accessible for maintenance and service and which will apply its full designed force to both center mechanisms for the entire vertical movement thereof.

It is accordingly a principal object of the present invention to provide a stripping mechanism for a dual cavity press of highly simplified construction which will apply the full design force throughout the entire vertical movement of both center mechanisms.

Another principal object is the provision of a simplified stripping mechanism which is readily accessible for service and maintenance purposes.

Another principal object is the provision of a stripping mechanism for a dual cavity press of simplified and inexpensive construction.

Still another important object is the provision of a stripping mechanism for a dual cavity press which can readily be made operational for only one cavity without affecting the operation for the other.

Still another object is the provision of a stripping mechanism for a dual cavity press utilizing relatively few, simple, inexpensive parts which are not subject to frequent maintenance, service, and replacement.

Yet another object is the provision of a dual cavity press which employs a single floating piston-cylinder assembly positioned exteriorly of the press base in the front of the press, the power stroke of the cylinder assembly being at least twice that required to elevate one of the center mechanisms.

A most important object is the provision of a dual cavity press having a less expensive and more reliable construction.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a front elevation, partially broken away and in section of a dual cavity press in accordance with the present invention;

FIG. 2 is a view similar to FIG. 1 illustrating the press opened and the stripping mechanism in operation;

Figure 3:
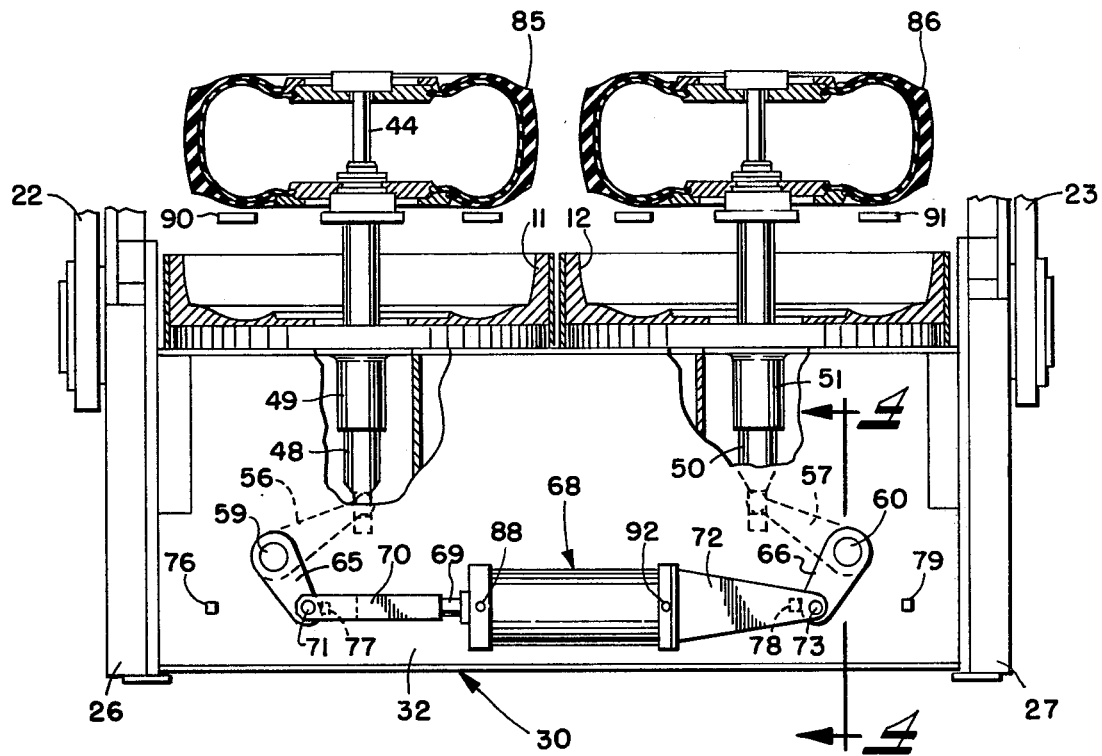
FIG. 3 is a view similar to FIGS. 1 and 2 illustrating the stripping operation completed for both cavities of the press.

Referring now to FIG. 1 there is illustrated a dual cavity tire press at 10 which includes side by side bottom mold sections 11 and 12 cooperating with side by side top mold sections 13 and 14, respectively, to form the two cavities of the press. The top mold sections are secured to platens 16 and 17, respectively, in turn secured to bolsters 18 and 19, respectively, each adjustably secured to the press head or beam 20. The beam is pivotally supported at the upper end of side links 22 and 23, which are pivoted at 24 and 25, respectively to bull gears 26 and 27. The bull gears are mounted on stub shafts 28 and 29, respectively, supported in the base 30 of the press, such base comprising front and rear parallel vertical plates 32 and 33, respectively. The press beam or head 20 is guided for opening and closing movement in cam slots or surfaces in side plates 34 and 35, which, as indicated in FIG. 1, are offset inwardly to accommodate the bull gears 26 and 27. The base 30 of the press supports bottom platens 37 and 38 which in turn support the bottom mold sections 11 and 12, respectively.

Projecting upwardly through the fixed bottom mold sections are center mechanisms indicated generally at 40 and 41, one for each cavity of the press. Each center mechanism is identical and accordingly only the center mechanism 40 will be described in detail. As illustrated, the center mechanism includes an annular open ended shaping bladder 42, the upper end of which is secured to clamping assembly 43 in turn secured to the top of vertically movable post 44. The lower end of the bladder is secured by clamping assembly 45, such assembly including a bottom bead or toe ring 46 of the bottom mold section 11. The lower clamping assembly 45 which includes the toe ring 46 is secured to housing 47 mounted on the top of cylindrical lift post 48. A piston situated within the post 48 actuates the rod 44 for vertical movement to extend the same and strip the bladder from the tire after the tire has been stripped from the bottom mold section. The post 48 is mounted for vertical sliding movement in housing 49 which is secured to the top of the base 30. The center mechanism 41 for the other cavity includes a similar cylindrical lift post 50 mounted for sliding movement in housing 51.

The bottom of each lift post is necked or narrowed as indicated at 53 in FIG. 2 to provide the bevel surfaces indicated, and the more narrow portion therebelow is provided with a horizontal slot indicated at 54. The slots in each post are aligned and common to a plane including the axes of the two mold cavities.

Each slot accommodates the rounded distal ends of lifting arms or levers 56 and 57, respectively. The respective lifting arms are in turn secured to parallel rock shafts 59 and 60.

Figure 4:
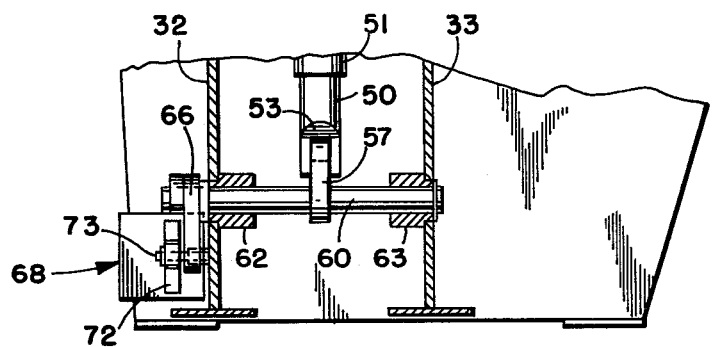
FIG. 4 is a fragmentary vertical section taken substantially on the line 4—4 of FIG. 3.

As seen more clearly in FIG. 4, such shafts are journaled between the front and rear plates 32 and 33 of the base as seen at 62 and 63 and both shafts project forwardly of the front plate 32. Secured to the forwardly projecting ends of such shafts are levers 65 and 66. Such levers are offset on the respective shafts approximately 90° therefrom.

A floating piston cylinder assembly 68 interconnects the distal ends of the levers 65 and 66. The rod 69 of such assembly is provided with a clevis eye 70 pivotally connected at 71 to the distal end of the lever 65. The blind end of the cylinder assembly is provided with a clevis 72 pivotally connected at 73 to the distal end of lever 66.

Secured to the front plate 32, for each lever 65 and 66, is a pair of stroke limiter stop blocks as indicated at 76 and 77 for the lever 65, and 78 and 79 for the lever 66. Also, as shown by the stop blocks 82 and 83 in dotted lines, the ready affixing of either such stop 82 or 83 in the position indicated will immobilize the adjacent lever and thus the center mechanism operated thereby without affecting the other.

In any event the cylinder assembly 68, which may, for example, be a high pressure water cylinder, is pivotally connected at each end to the mechanism operating the respective center mechanism for each cavity. In such position, the cylinder assembly is supported in front of the front plate 32 for ready access for service and maintenance.

As will be appreciated from the description of the operation below, the cylinder assembly 68 has a stroke twice that required to elevate or lower one center mechanism.

OPERATION

Referring first to FIG. 1, the press is illustrated closed with tires 85 and 86 in each cavity. After the press is opened by rotation of the bull gears 26 and 27 elevating links 22 and 23 stripping the top molds from the tires, the piston-cylinder assembly 68 is then pressurized through port 88. This retracts the piston rod 69 pulling the two pivot connections 71 and 73 toward each other. The pressurization of the cylinder applies its full force to each bead lift post 48 and 50 simultaneously. However, due to the inherent differences in the static friction of the two systems, one such post will normally move ahead of the other. This may in part be due to differences in stripping characteristics of the respective tires. In any event the full force of the cylinder continues and as illustrated the tire 85 which is the first to free from the bottom mold section 11 moves to its elevated position as seen in FIG. 2. In FIG. 2, the cylinder assembly 68 has however, completed only approximately half of its stroke. The full force of the cylinder assembly continues now elevating the tire 86 to its full extended position as seen in FIG. 3. In such position in FIG. 3 the bead lift assemblies are fully elevated and the piston-cylinder assembly is fully retracted with the levers against the noted stops. In such elevated position, tire unloaders seen at 90 and 91 may be positioned beneath the tire before the bladder is stripped from the tire by elevation of the posts 44 supporting the top clamping assemblies 43. Such posts are normally elevated as the lower beads descend. This is of course accomplished by applying pressure to port 92 to cause the piston-cylinder assembly 68 to extend. Again substantial force may be required both to strip the bladder from the tire and positively to seat the lower bead ring in each cavity of the lower mold. When pressure is applied to either port, the opposite port is of course connected to tank. The mechanism, on either stroke, does not stop until both bead rings are either fully elevated or firmly seated in the lower mold sections.

It can now be seen that there is provided a highly simplified bead lift mechanism for stripping tires from the lower mold sections in dual cavity presses, such mechanism employing a single cylinder, the full force of which is applied to each center mechanism throughout its entire stroke. Moreover, most of the operating mechanism is in front of the press and very easily accessible for any maintenance or replacement required. Ease of accessibility offers lower maintenance down-time thus resulting in higher press productivity. Further, by optionally positioning the stops 82 or 83, the press can be made fully operational for only one cavity, the other outside lever being locked against movement. By placing such optional stop on either lever, the effective stroke of the piston-cylinder assembly is simply reduced by approximately one half. In any event, a less expensive and highly simplified stripping mechanism is provided which is readily accessible for maintenance or replacement.

Other modes of applying the principle of the invention may be employed, change being made as regards the details described, provided the features stated in any of the following claims or the equivalent of such be employed.

I claim:

1. A dual cavity tire press for curing two tires in side-by-side relationship, each cavity including a bottom mold section, vertically movable tire stripping mechanisms extending through said bottom mold section and operative when moved upwardly to strip a tire from the respective bottom mold sections, and a single piston-cylinder assembly extending between said mechanisms for moving the same vertically with its rod connected to one and its cylinder connected to the other.

2. A press as set forth in claim 1 wherein each tire stripping mechanism includes a vertically extending post, and respective lift arms supporting the lower end of each post for vertical movement, said piston-cylinder assembly interconnecting said lift arms for swinging movement.

3. A press as set forth in claim 2 including a rock shaft supporting each lifting arm for such swinging movement, and a lever secured to each rock shaft, the rod of said piston-cylinder assembly being connected to one lever while the cylinder is connected to the other.

4. A press as set forth in claim 3 wherein said bottom mold sections are supported on a base having parallel front and rear vertical plates, each rock shaft being journaled between said plates.

5. A press as set forth in claim 4 wherein each lift arm is secured to its respective rock shaft between said plates, and each said lever is secured to a projecting end of its respective rock shaft exteriorly of one of said plates.

6. A press as set forth in claim 5 wherein said levers are exteriorly of said front plate and said piston-cylinder assembly extends generally horizontally exteriorly of said front plate and is pivotally supported from and connected to the distal end of each lever.

7. A press as set forth in claim 6 including a pair of stop blocks secured to said front plate for each lever limiting the movement thereof.

8. A press as set forth in claim 7 wherein the stroke of said piston-cylinder assembly is at least twice the distance between the blocks of each pair.

9. A press as set forth in claim 3 including a pair of stop blocks for each lever, the stroke of said piston-cylinder assembly being at least twice the distance between the stop blocks of each pair.

10. A dual cavity tire press, each cavity including a top and bottom mold section, a center mechanism including a shaping bladder for each cavity, means mounting each center mechanism for vertical movement to strip the tire from the bottom mold section while the bladder is within the tire, and a single piston-cylinder assembly extending horizontally between said center mechanisms to move the same vertically with the piston connected to one center mechanism and the cylinder connected to the other so that when said piston-cylinder assembly is pressurized the full force thereof is applied to both center mechanisms simultaneously.

11. A press as set forth in claim 10 wherein the bottom mold sections are supported side-by-side on a base including front and rear parallel vertical plates, each center mechanism being between said plates while said piston-cylinder assembly is in front of said front plate.

12. A press as set forth in claim 10 wherein each center mechanism includes a vertically movable post, and a pivotally mounted lifting arm supporting each post for vertical movement, each lifting arm being in a place substantially common to said posts.

13. A press as set forth in claim 12 including a rock shaft for each lifting arm journaled between said front and rear plates normal to but offset from said posts.

14. A press as set forth in claim 13 wherein said posts are between said rock shafts.

15. A press as set forth in claim 13 wherein said rock shafts project forwardly of said front plate and each has a lever secured thereto forwardly of said front plate, said piston-cylinder assembly interconnecting said levers.

16. A press as set forth in claim 15 including lever stops secured to said front plate limiting the movement thereof and thus limiting the stroke of said piston-cylinder assembly.

17. A press as set forth in claim 15 wherein said lifting arms and levers are offset on each rock shaft approximately 90°.

18. A press as set forth in claim 10 wherein said piston-cylinder assembly has a relative stroke in excess of twice the required vertical movement of one of said center mechanisms.

19. A press as set forth in claim 10 including removable stop means operative to block movement of one of said center mechanisms without affecting operation of the other.

20. A press as set forth in claim 10 including respective lever means interconnecting the piston and one center mechanism and the cylinder and the other center mechanism to move the center mechanisms vertically in response to horizontal movement of said piston-cylinder assembly.

21. A dual cavity press including side-by-side bottom mold sections, a vertically movable center mechanism in each bottom mold section for stripping a tire therefrom, and a single linear fluid motor for elevating said tire stripping mechanisms, the power stroke of said motor being at least twice that required to elevate one of said center mechanisms.

22. A dual cavity press as set forth in claim 21 including means optionally to block movement of one center mechanism without affecting operation of the other, the other being than operated by approximately one half the power stroke of the motor.

* * * * *